United States Patent [19]

Clauss

[11] 4,124,106
[45] Nov. 7, 1978

[54] WEDGING CENTRIFUGAL LOCK UP CLUTCH WITH TORQUE LIMITER

[75] Inventor: Julius A. Clauss, Birmingham, Mich.

[73] Assignee: Borg-Warner Corporation, Chicago, Ill.

[21] Appl. No.: 754,934

[22] Filed: Dec. 28, 1976

[51] Int. Cl.² ............................................. F16D 43/14
[52] U.S. Cl. ................................ 192/3.31; 192/103 B; 192/45.1; 192/54
[58] Field of Search ........... 192/3.31, 105 BA, 103 B, 192/54, 45.1, 41 R

[56] References Cited

U.S. PATENT DOCUMENTS

| | | | |
|---|---|---|---|
| 2,184,606 | 12/1939 | Lavaud | 192/3.31 X |
| 3,118,292 | 1/1964 | Schroter et al. | 192/54 X |
| 3,338,361 | 8/1967 | Hoff | 192/54 X |
| 3,717,229 | 2/1973 | Perlick | 192/85 AA |
| 4,037,691 | 7/1977 | Ivey | 192/3.31 |

FOREIGN PATENT DOCUMENTS 518,587   4/1953   Belgium .................................. 192/41 R

*Primary Examiner*—Benjamin W. Wyche
*Attorney, Agent, or Firm*—Robert L. Zieg

[57] ABSTRACT

A speed-responsive engaging mechanism adapted for use in a hydrodynamic device to couple turbine and impeller members including a disc secured to the turbine member having a series of cam surfaces thereon formed in apertures in the discs with a series of friction shoe assemblies mounted in the apertures in engagement with the cam surfaces. The friction shoe assemblies engage with the impeller at a predetermined speed of rotation of the turbine member, and the cam members induce a wedging engagement of the shoes with the impeller member. The cam members are flexible to limit the amount of torque which can be developed by the wedging action.

3 Claims, 3 Drawing Figures

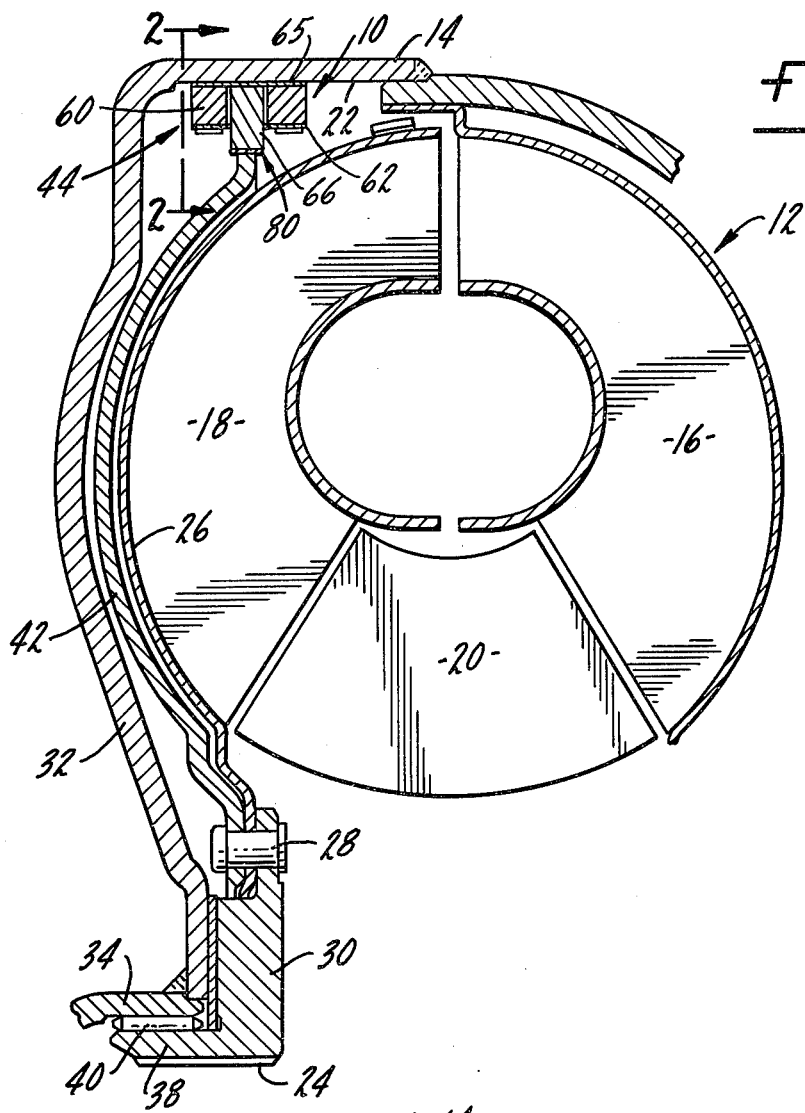

WEDGING CENTRIFUGAL LOCK UP CLUTCH WITH TORQUE LIMITER

BACKGROUND OF THE INVENTION

1. Field of the Invention

This application relates to the field of speed-responsive engaging devices for hydrodynamic devices.

2. Prior Art

It is known in the prior art to provide lock-up clutches for hydrodynamic devices. More particularly, copending application, Ser. No. 732,265, filed Oct. 14, 1976 of common assignee provides a clutch mechanism for hydrodynamic devices having a shoe assembly having a roller therein and engaged by centrifugal force and, in addition, engaged by the wedging effect of a cam surface on the roller mechanism and such clutch devices lock together the impeller and turbine elements to improve efficiency by eliminating slippage. It has been recognized that the structures of the aforementioned applications as well as the device to be described herein provide a solution to the problem of lock-up clutches to provide a lock-up clutch which disengages during torque impulses or torque reversals to provide smooth, shockless operation and eliminate torsional vibrations.

These previous solutions to the torque converter clutch problem, although workable and dramatic improvements over those known prior, can operate in certain environments wherein the self-energizing effect of the cam and roller is so great that the shoes can be resistant to coming out of engagement at the proper time. Typically, self-energizing clutches need a simple and economical way of control so that they will engage and disengage at the proper time.

SUMMARY OF THE INVENTION

The present invention achieves all of the desirable objects listed above and provides an improved clutch mechanism for a hydraulic device in which there is a means to limit the torque which can be developed by the self-energizing feature of the assembly. The torque limiting structure is comprised of separate cam members mounted in apertures and engaged by follower mechanisms and the separate cam members being flexible with respect to their mounting whereby the angle of the engagement varies to vary the effect of the self-energizing feature.

Another approach which can achieve the objectives discussed by a different form of torque limiting feature is shown in copending application Ser. No. 754,935 filed Dec. 28, 1976 of common assignee.

BRIEF DESCRIPTION OF THE DRAWINGS

FIG. 1 is a cross-sectional view through a clutch mechanism for a hydraulic torque converter;

FIG. 2 is a sectional view taken along the lines 2—2 of FIG. 1; and

FIG. 3 is a view similar to FIG. 2 showing a modified form of the invention.

BRIEF DESCRIPTION OF THE PREFERRED EMBODIMENT

Referring to FIG. 1, an improved lock-up clutch or engaging mechanism 10 is disclosed. Clutch 10 is shown in a hydrodynamic device 12 which may be a hydraulic torque converter having a drive shell 14 connected to drive a vaned impeller member 16. Torque converter 12 includes a vaned turbine member 18 driven hydrodynamically by impeller 16 and includes a stator member 20. The improved lock-up clutch 10 is operative to lock the turbine to the impeller by means of frictional engagement between clutch 10 and an inner annular surface 22 in shell 14.

Turbine 18 includes an outer radial vaned portion 26 which is connected to a hub 30 by rivets 28. Hub 30 is splined at 24 to be connected to a transmission input shaft as is known in the art. Drive shell 14 includes a radially extending portion 32 connected to a central hub 34 which is driven by the engine of the vehicle. Hub 30 of turbine 18 includes an axially extending bearing portion 38. A bearing 40 is provided mounting hub 30 within hub portion 34. Turbine 18 is thus mounted for concentric rotation within shell 14 to provide for concentric rotation between the turbine and impeller 16.

The unique clutch 10 of the present invention is comprised of an annular curved disc 42 and friction devices or shoe assemblies 44. Disc 42 is concentrically mounted upon turbine hub 30 and is secured thereto by rivets 28. Annular discs 42 is curved to conform with the shape and curvature of turbine 18 and radial portion 32 to provide minimum space requirements for clutch mechanism 10 within torque converter 12. As illustrated in FIG. 2, disc 42 has a series of apertures 50 in which shoe assemblies 44 are mounted. Apertures 50 includes a series of T-shaped projections 52 which define tabs 54 extending radially toward the center of apertures 50. Tabs 54 have cooperative engagement with shoe assemblies 44 to retain same on discs 42. Also provided centrally of apertures 50 is a cam aperture 56.

The shoe assembly 44 of FIGS. 1 and 2 is very similar to that disclosed and described in copending application Ser. No. 700,998; filed June 29, 1976; of common assignee; and reference may be made to that application for a more detailed description of the structure of shoe assembly 44 and the general operation of the clutch device.

The shoe assembly 144 of FIG. 3 which is later discussed is very similar in construction to that disclosed and described in copending application Ser. No. 732,265; filed Oct. 14, 1976; of common assignee; and reference may be made to that application for a more detailed description of the structure of shoe assembly 144.

Shoe assemblies 44 are comprised of a rectangular friction shoe 60 being generally arcuate in cross-section to conform with the arcuate shape of surface 22. Assembled to shoe 60 is a retainer 62 secured thereto by rivets 64, and a friction lining 65. Also assembled to the shoe is a follower mechanism 66 which may comprise an insert as described in the above mentioned application Ser. No. 700,998.

Friction lining 65 is bonded to the external arcuate surface on shoe 60. Friction lining 65 may be of a paper of other known type.

Spring 62 retains shoe assembly 44 within the disc 42 by engaging under tabs 54. The shoes 60 may have a stop surface 70 thereon which can engage with the end of tabs 54 to limit the extent of arcuate movement of shoe 60.

As discussed above, the present invention provides a unique torque limiting feature in the self-energizing and centrifugal clutch 10 described herein. The torque limiting feature is provided by utilizing a cam member 80 which is comprised of a flexible hardened steel member which has a "U" shaped end portion 82 secured to the disc 42 by spot welding or riveting, for example, as indicated at 84. Cam member 80 includes a cam portion 86 which is located within cam aperture 56 and is movable toward the surface 88, as will be described, when under load. A retaining projection 90 provided on disc 42 limits outer radial movement of cam portion 86.

The operation of the device of the present invention is generally similar to that described with respect to the aforementioned copending applications. In general the operation is that when the parts are at rest, or under idle conditions, spring 62 retracts shoe assemblies 44 inwardly and retains the shoe assemblies 44 within apertures 50 in disc 42. When a predetermined speed of rotation is reached, the shoe assembly 44 will move out to an extent to engage friction lining 65 with the surface 22 in shell 14, the shell 14 moving faster at this time than the disc 42 and turbine 18. The relative movement between the shell 14 and the disc 42 will move shoe assemblies 44 clockwise, as viewed in the drawings, the follower 66 moving along cam portion 86 and performing a wedging action as described in the aforementioned applications which tends to produce a self-energizing feature increasing the torque capacity of the clutch by means of the cam-wedging action.

Normally the torque capacity of the unit can increase as the wedging between the roller and cam increases. However, in the present application the unique torque limiting feature is provided in that when desired torque capacity of a predetermined amount is being reached, the resistance to further wedging action of the rollers 72 and cam 56 will be such to create a force which exceeds the force asserted by cam member 80 against follower 66 and cam portion 86 begins to move inward changing its wedging angle and reducing the self-energizing or wedging force. In one example, the beginning ramp angle "a" may be 12° and may increase to angle "b" of 21° for example to reduce the self-energizing effect and decrease torque capacity. An used herein, the ramp angle is the angle between a radius from the center of rotation through the center of curvature of follower 66 and a line from the center of curvature of follower 66 and normal to the surface on cam portion 86 at the point of engagement.

Optionally, the unit may be designed so that stop surface 70 may engage the end of tab 54 to put an absolute limit on the torque capacity build-up due to wedging by stopping the arcuate movement of shoe assembly 44 with respect to disc 42. When surface 70 engages tab 54, a split power path, is derived through the clutch 10 in that part of the torque may be carried by the connection between surface 70 and tab 54 and part may be carried by the followers 66 and their engagement with the cam surface 56. This should result in increased life of the friction surfaces and the follower and cam surfaces since the loading on the roller and cam surface is reduced and no further axially displacement between shoe 60 and surface 22 is possible.

Thus, by use of a flexible cam member 80 as described above, the torque available is limited depending upon the angle of portion 86 and the resistance to flexing provided in cam portion 86. In a very convenient manner, by easily varying the torque capacity of the clutch, each clutch can be individually tailored to a particular engine and automatic transmission combination to provide proper upshifts and downshifts in the automatic transmission as described in copending application Ser. No. 732,265 filed Oct. 14, 1976. The clutch will come out of the engagement when desired since the wedging effect is limited.

Referring to FIG. 3, a modified form of the structure is shown. Like elements of FIG. 3 to those of FIGS. 1 and 2 carry like numerals with the addition of the prefix "1," in other words, the numbers are in the "100" series in FIG. 3.

Shoe assemblies 144 are comprised of a rectangular friction shoe 160 being generally arcuate in cross-section. Assembled to shoe 160 is spring 162 and a friction lining 165. Also assembled to the shoe is a roller mechanism 166 and a roller retainer 168. Roller mechanism 166 is comprised of a roller pin or axle 169 upon which a roller 172 is mounted. Roller 172 is centrally mounted in shoe 160 in a rectangular slot upon axle 170. Axle 170 is received in a bearing support or journal defined within a raised portion 178 on retainer 168.

The operation of the device of FIG. 3 is almost identical to that described with respect to FIGS. 1 and 2. In general the operation is that when the parts are at rest, spring 162 retracts shoe assemblies 144 inwardly and retains shoe assemblies 144 within the discs 142. When a predetermined speed of rotation is reached, the shoe assembly 144 will move out to an extent to engage friction lining 165 with the surface 22 in shell 14, the shell 14 moving faster at this time than the disc 42 and turbine 18. The relative movement between the shell 14 and the disc 142 will move shoe assemblies 144 clockwise, as viewed in the drawings, the roller 172 moving along cam portion 186 and performing a wedging action as described in the aforementioned application which tends to produce a self-energizing feature increasing the torque capacity of the clutch by means of the cam-wedging action.

The roller 172 is used to provide for minimum friction between the shoe assemblies and the cam portion 186 as has been found beneficial in torque converter clutches of this type. The construction of FIG. 3 provides torque limiting identical to the structure of FIG. 2 with cam portion 186 moving inwardly to vary the wedging action as described above for FIG. 2.

The engaging mechanism 10 of the present invention, when installed in a hydraulic torque converter as used in an automotive automatic transmission, will release under several conditions which are desired in an environment of this type. The release and reengagement of the clutch 10 occurs due to the inherent structure of the device without the requirement of any outside controls.

Due to the design of clutch 10, when the clutch is locked up during operation of the vehicle and the throttle of the vehicle is suddenly depressed to demand higher torque, the drive-line torque will rise to a greater value than the torque capacity of clutch 10 causing clutch 10 to release and allowing the hydraulic torque converter to return to slipping condition, which is desired at such times. This condition may also occur on upshifts in the transmission when a sudden surge or increase in torque will occur momentarily.

When a torque reversal occurs in the drive-line, due to the inherent characteristics of clutch 10, the wedging effect is removed, and the torque capacity of clutch 10 drops to a lower value. Thus, the clutch momentarily releases on downshifts, since a torque reversal may occur at such times. As known in the art, during shifting, release of clutch 10 is desired to allow the converter to return to its shock absorbing characteristics.

It has also been found during test work that upon shifting or ratio changing in an automatic transmission with the present device installed, the torque pulse or reversal which occurs during a shift allows the lock-up clutch 10 to release under these conditions. This inherent feature of the present design is extremely important in that automatic shifts are much smoother when a hydraulic torque converter is operating in its released or normal manner; and if a torque converter is locked up, as, for example, by a conventional lock-up clutch at the time of the shift, the shift could be much harsher than desirable. It has been found that the present invention is improved by the torque limiting feature described herein which insures that the torque capacity will be such that the clutch will release as desired in even the most difficult environments.

Various of the features of the invention have been particularly shown and described, however, it should be obvious to one skilled in the art that modifications may be made therein without departing from the scope of the invention.

What is claimed is:

1. A clutch mechanism for a hydrokinetic device including impeller and turbine members, an annular disc fixed to said turbine member, a plurality of shoe assemblies mounted in said disc, separate cam members secured to said disc, said assemblies including follower means in engagement with said cam members, said assemblies having a frictional surface theron, centrifugal force acting to urge said assemblies into engagement with said impeller member at a given speed of rotation, said assemblies moving along said cam means after initial engagement whereby said devices are wedged between said disc and said impeller member to increase the torque capacity of the clutch in self-energizing manner, torque limiting means to limit the maximum torque capacity of the clutch, said torque limiting means comprising said cam members resiliently movable with respect to said disc whereby the angle of said cam with respect to said impeller varies under load wherein said cam members comprise flexible members secured in apertures in said disc.

2. A mechanism as claimed in claim 1 wherein said shoe assemblies have stop means to limit arcuate travel of said shoes with respect to said discs.

3. A mechanism as claimed in claim 1 wherein said follower means comprises a roller mechanism.

* * * * *